Feb. 13, 1968   E. H. TARRANT   3,368,700
BOARD SEPARATING APPARATUS
Filed Oct. 18, 1965   2 Sheets-Sheet 1
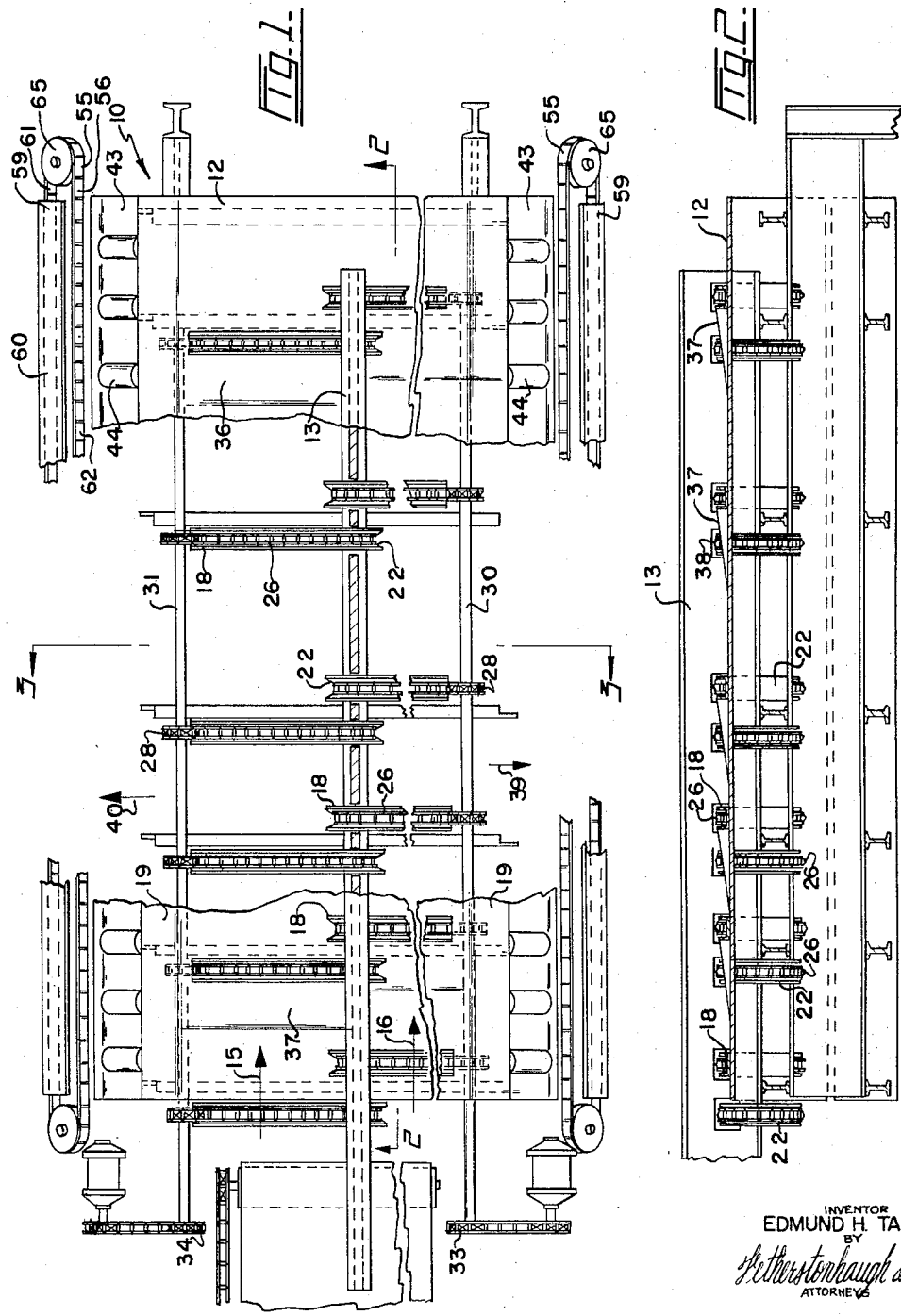
INVENTOR
EDMUND H. TARRANT
BY
Featherstonhaugh & Co.
ATTORNEYS Feb. 13, 1968  E. H. TARRANT  3,368,700
BOARD SEPARATING APPARATUS
Filed Oct. 18, 1965  2 Sheets-Sheet 2
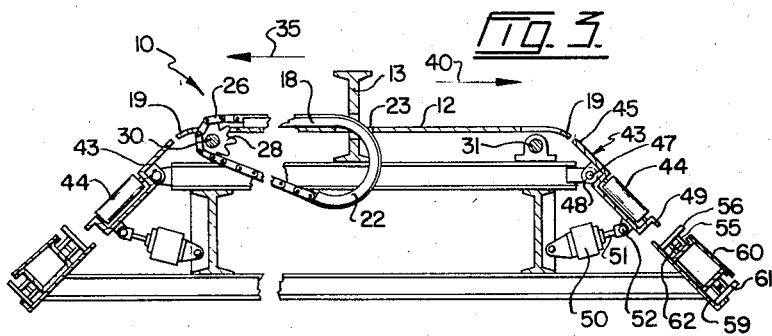
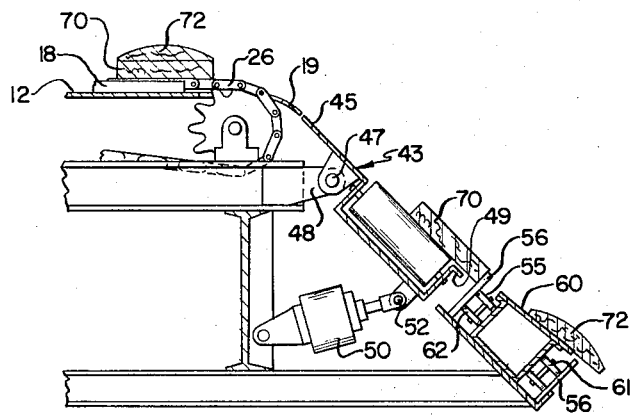
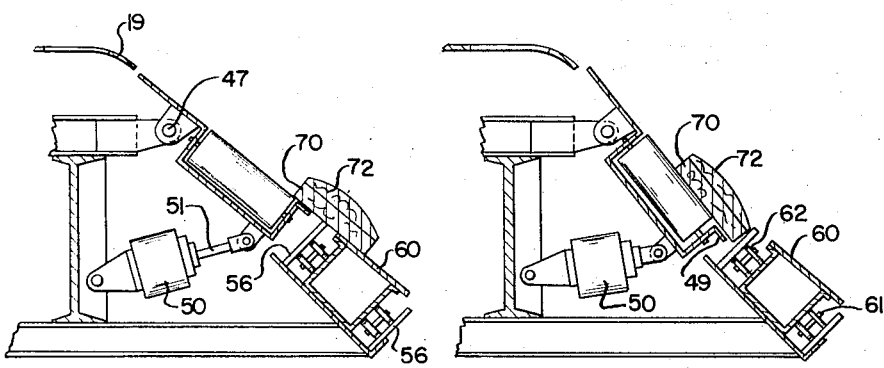
INVENTOR
EDMUND H. TARRANT
BY
Fetherstonhaugh & Co.
ATTORNEYS

United States Patent Office 3,368,700
Patented Feb. 13, 1968

3,368,700
BOARD SEPARATING APPARATUS
Edmund H. Tarrant, Burnaby, British Columbia, Canada, assignor to MacMillan, Bloedel and Powell River Limited, Vancouver, British Columbia, Canada
Filed Oct. 18, 1965, Ser. No. 496,782
17 Claims. (Cl. 214—8.5)

ABSTRACT OF THE DISCLOSURE

Board separating apparatus including an inclined ramp down which unseparated upper and lower boards slide laterally, stop means along and projecting above the surface of a lower edge of the ramp, and means for changing the relative position of the ramp lower edge and the stop means to adjust the amount of the stop means projecting above the ramp surface, said changing means being operable selectively to cause the stop means to engage the lower board alone, both boards or neither board.

---

This invention relates to apparatus for separating boards from each other which have been cut parallel to their largest dimension.

This apparatus is primarily designed for separating slabs or boards behind what is known as a horizontal resaw, but it can be used in any desired situation. The horizontal resaw cuts a board or slab horizontally, and the upper piece, usually waste, remains on the lower piece.

The present apparatus normally separates two superimposed slabs or boards, moving the lower board in one direction and the upper board in another direction. However, the apparatus can be operated to move both boards in either of these two directions. The apparatus includes a deck or table on to which cut but unseparated boards are moved in an endwise direction, after which said boards are moved sideways towards either or both edges of the deck. Some advantages of this apparatus over the separators of the past are:

(a) The entire top of a deck or table is useful as a lateral conveyor.

(b) The superimposed boards being moved laterally are separated when the lower board is suddenly stopped while the upper board is allowed to continue movement in the lateral direction. The separating velocity is created by gravity so that the heavier the wood, the greater is the separating force.

(c) Said lower boards are removed after separation by an edge conveyor which assists in the separation.

(d) The apparatus can readily be adjusted to separate boards or slabs of different thicknesses.

Apparatus according to the present invention comprises a table on to which longitudinally-cut but unseparated boards are moved in an endwise direction, a downwardly-inclined ramp along at least one side of the table, and stop means along the lower edge of the ramp projecting above the surface thereof. Means is provided for relatively adjusting the lower edge of the ramp and the stop means to adjust the amount of the latter projecting above the ramp surface. This adjustment enables boards of various thicknesses to be separated. Conveying means on the table shifts the boards laterally on to the ramp so that they slide laterally down this ramp under gravity until the lower board engages the stop, at which time momentum separates the upper board therefrom.

An example of this invention is illustrated in the accompanying drawings, in which, FIGURE 1 is a plan view of the separating apparatus, FIGURE 2 is a longitudinal sectional view taken on the line 2—2 of FIGURE 1, FIGURE 3 is an enlarged cross section taken on the line 3—3 of FIGURE 1, FIGURE 4 is a diagrammatic cross sectional view showing the apparatus in a normal position of operation, FIGURE 5 is a view similar to FIGURE 4 showing the apparatus in another position of operation, and FIGURE 6 is a view similar to FIGURE 4 showing the apparatus in still another position of operation.

Referring to the drawings, 10 is board separating apparatus according to the present invention including a deck or table 12 which has a central divider 13 projecting upwardly and extending longitudinally thereof. Boards are directed in any convenient manner on to and moved endwise of table 12 in the direction of arrows 15 and 16 on opposite sides of divider 13. A plurality of troughs 18 are mounted on the upper surface of table 12 and extend from beneath divider 13 transversely to each side edge 19 of the table. Each trough 18 is formed with a curved inner end 22 beneath divider 13 and which extends downwardly through an opening 23 formed in the table, see FIGURE 3. There is a set of troughs 18 on one side of divider 13, and another set of these troughs on the opposite side of said divider, see FIGURE 1. A chain conveyor 26 is located in each trough 18. Each conveyor 26 extends around the curved end 22 of its trough at one end of the latter, and around a sprocket 28 aligned with the outer end of said trough. All the sprockets adjacent one side edge 19 of the table are mounted on a common shaft 30, while all said sprockets 28 near the opposite edge 19 of the table are mounted on another common shaft 31. Shafts 30 and 31 extend longitudinally of table 12 below the top thereof, and sprockets 33 and 34 mounted on shafts 30 and 31 near the ends thereof are operatively connected to one or two sources of power, not shown.

Each chain conveyor 26 projects a little above the trough 18 in which the chain is located so as to be able to shift boards laterally towards a side edge of table 12. A ramp 37, see FIGURE 2, is inclined from the top of table 12 to the upper edge of each trough 18 in order to guide the ends of boards moving endwise in the direction of arrows 15 and 16 over the adjacent trough so that said boards can be carried by conveyors 26. The conveyor chains 26 have a roof-top construction which acts as a continuation of ramp 37, as indicated at 38 in FIGURE 2. Shafts 30 and 31 are rotated in opposite directions so that the transverse conveyors 26 can move boards outwardly in the direction of arrows 39 and 40 towards the side edges 19 of the table.

Ramps or aprons 43 are connected to the side edges 19 of the table and are inclined outwardly and downwardly therefrom, see FIGURE 3. Each ramp has a plurality of rollers 44 rotatably mounted therein and projecting slightly above the ramp surface, see FIGURE 3. The axis of each roller 44 extends transversely of the ramp so that said roll is inclined downwardly in an endwise direction. As the ramps 43 at opposite sides of the table and the elements associated therewith are identical, only one will be described in detail.

By referring to FIGURE 3, it will be seen that ramp 43 has an upper edge 45 which extends to the adjacent side edge 19 of table 12. Ramp or apron 43 is swingably mounted on a horizontal rod 47 carried by a support 48 projecting laterally from table 12 beneath the top thereof. Rod 47 is positioned near but spaced below the upper edge 45 of the ramp. The lower edge 49 of ramp or apron 43 is swingable about rod 47, and suitable apparatus is provided for moving this edge, such as one or more actuating cylinders 50, each having a ram 51 projecting therefrom and connected to the ramp near the lower edge thereof by a pin 52. Cylinder 50 can be operated to swing ramp 43 about rod 47, thereby raising and lowering edge 49 of the ramp.

Stop means is provided at the lower edge 49 of ramp 43, but clear of said ramp. In this example, the stop means is in the form of an endless conveyor 55 having lugs 56 projecting outwardly therefrom. Conveyor 55 extends around a base 59 having an upper surface 60 which acts as a chute to direct slabs or boards over the return portion 61 of conveyor 55, the upper portion 62 of which extends along lower edge 49 of ramp 43. Conveyor 55 extends around a sprocket 65 which is driven by a suitable source of power, not shown.

During the operation of separating apparatus 10, boards that have been longitudinally cut into lower boards or slabs 70 and upper boards or slabs 72, but have not been separated, are directed endwise over the surface of table 12 in the direction of arrows 15 and 16. When one of these double boards is deposited over a plurality of troughs 18, continually moving chain conveyors 26 in these troughs, shift the board laterally in the direction of arrow 39 or 40 over an edge 19 of the table and on to a ramp or apron 43. The double board now slides down the ramp under the action of gravity. The lower edge 49 of the ramp is set by means of cylinder or cylinders 50 until only sufficient of the upper portion 62 of edge conveyor 55 projects above the surface of the ramp to catch lower board 70. This lower board is suddenly stopped by the conveyor, while momentum carries the upper board 72 over chute 60 where it is discharged into a bin or on to another conveyor, not shown. Thus, lower and upper boards 70 and 72 are separated by momentum, and lower board 70 is moved endwise along ramp 43 by conveyor 55, to the end of the latter where it is discharged. If the thickness of lower boards 70 changes, the lower edge 49 of ramp 43 can be shifted relative to the upper run of conveyor 55 to enable a proper separation of the lower and upper boards. FIGURE 4 illustrates ramp 43 set for normal operation in order to separate the lower and upper boards.

The cutting of the boards may be such that the upper board 72 is waste so that the waste is separated from a good board 70. However, if the operator sees that the upper board is worth saving, he can operate cylinders 50 to lower ramp edge 49 relative to conveyor 55 so that the upper board will not be separated from the lower board, see FIGURE 5. On the other hand, if the operator sees that both boards should be discharged, he can shift edge 49 of the ramp upwardly relative to the conveyor so that both boards pass along chute 60, see FIGURE 6.

Separating apparatus 10 is superior to devices for the same purpose used in the past because the entire surface of table is available for shifting double boards laterally on to the ramps 43 at the side edges of the table. As the separation of the cut boards takes place after they have moved downwardly over ramps 43 under the action of gravity, the heavier the boards, which would normally make it harder to separate them, the greater the separating force so that there is practically no likelihood of the upper board remaining partially or completely on the lower board after the latter has struck conveyor 55 at the lower edge of the ramp. As edge conveyors 55 are inclined, they take less floor space than horizontal conveyors require. Furthermore, merely by operating cylinders 50, ramps 43 can be quickly, easily and instantly adjusted to suit boards of different thicknesses.

What I claim as my invention is:

1. Board separating apparatus comprising a table on to which longitudinally-cut but unseparated upper and lower boards are moved in an endwise direction, a downwardly-inclined ramp along a side of the table, stop means free of and along a lower edge of the ramp projecting upwardly past and above the surface thereof, means for relatively adjusting the lower edge of the ramp and the stop means to adjust the amount of the latter projecting upwardly above the ramp surface, and conveying means on the table for shifting said boards laterally on to the ramp, said boards on being shifted on to the ramp sliding laterally down the ramp under gravity and said adjusting means being operable to cause the lower board to engage the stop means, at which time momentum separates the upper board therefrom.

2. Board separating apparatus as claimed in claim 1 in which the stop means is in the form of a conveyor extending along the lower edge of the ramp adapted to shift boards engaged thereby along said ramp.

3. Board separating apparatus as claimed in claim 1 in which the lower edge of the ramp is movable relative to the stop means to provide for said relative adjustment therebetween.

4. Board separating apparatus as claimed in claim 3 including power means for raising and lowering said lower edge of the ramp relative to the stop means.

5. Board separating apparatus as claimed in claim 2 in which said conveyor is an endless power-driven conveyor.

6. Board separating apparatus as claimed in claim 2 including a chute over said conveyor for receiving said upper boards when the latter are separated from the lower boards.

7. Board separating apparatus comprising a table along which longitudinally-cut but unseparated upper and lower boards are moved in an endwise direction, a ramp extending along a side of the table and inclined downwardly from the surface thereof, conveying means on the table for shifting said boards laterally on to the ramp, a conveyor extending along a lower edge of the ramp and acting as a stop for boards sliding sideways down said ramp, and means for shifting said ramp lower edge substantially vertically relative to said conveyor to adjust the amount of conveyor projecting above the ramp surface up to an amount substantially equal to about the thickness of the thickest lower board to be handled, said conveyor being adapted to shift boards stopped thereby along the ramp while upper boards on top of said stopped boards continue their downward movement beyond the conveyor.

8. Board separating apparatus comprising a table along which longitudinally-cut but unseparated upper and lower boards are moved in an endwise direction, a ramp extending along a side of the table and steeply inclined downwardly from the surface thereof, conveying means on the table for shifting said boards laterally on to the ramp, a narrow conveyor extending along a lower edge of the ramp and acting as a stop for boards sliding sideways down said ramp, and means for shifting said ramp lower edge substantially vertically relative to said conveyor projecting above the ramp surface up to an amount substantially equal to about the thickness of the thickest lower board to be handled, said conveyor being adapted to shift boards stopped thereby along the ramp while upper boards on top of said stopped boards continue their downward movement beyond the conveyor.

9. Board separating apparatus as claimed in claim 7 in which the ramp is hingedly mounted adjacent an upper edge thereof, and said shifting means for the ramp is connected thereto adjacent the lower edge thereof.

10. Board separating apparatus as claimed in claim 7 in which the ramp is hingedly mounted adjacent an upper edge thereof, and said shifting means for the ramp includes power means connected to the ramp adjacent the lower edge thereof.

11. Board separating apparatus comprising an inclined ramp, stop means free of and along a lower edge of the ramp projecting upwardly past and above the surface thereof, means for changing the relative position of the ramp lower edge and said stop means to adjust the amount of the stop means projecting above the ramp surface, and means for shifting longitudinally-cut but unseparated upper and lower boards laterally on to the ramp at an upper edge thereof, said boards sliding laterally down the ramp under gravity until the lower board engages the stop means, at which time momentum separates the upper board therefrom.

12. Board separating apparatus as claimed in claim 11 in which the stop means is in the form of a conveyor extending along the lower edge of the ramp adapted to shift boards engaged thereby along said ramp.

13. Board separating apparatus as claimed in claim 7 including a chute over said conveyor for receiving said upper boards when the latter are separated from the lower boards.

14. Board separating apparatus as claimed in claim 11 in which the stop means is in the form of an endless conveyor extending along the lower edge of the ramp and inclined laterally at substantially the same angle of incline as the ramp, said conveyor having an upper run extending along the ramp lower edge and normally projecting above the ramp surface to be engaged by lower boards sliding down the ramp.

15. Board separating apparatus as claimed in claim 11 in which the stop means is in the form of an endless conveyor extending along the lower edge of the ramp and inclined laterally at substantially the same angle of incline as the ramp, said conveyor having an upper run extending along the ramp lower edge and normally projecting above the ramp surface to be engaged by lower boards sliding down the ramp, and the ramp is hingedly mounted to enable said lower edge thereof to be moved up and down relative to said conveyor upper run to adjust the amount of the latter projecting above the ramp surface.

16. Board separating apparatus as claimed in claim 15 including an inclined chute over said laterally-inclined conveyor for receiving said upper boards when the latter are separated from the lower boards.

17. Board separating apparatus as claimed in claim 15 including power means connected to the ramp operable to swing the lower edge thereof up and down relative to the conveyor upper run.

References Cited
UNITED STATES PATENTS 996,386  6/1911  Williams _____ 214—308 X

FOREIGN PATENTS 143,006  8/1951  Australia.
1,198,324  6/1959  France.

GERALD M. FORLENZA, *Primary Examiner.*

G. F. ABRAHAM, *Assistant Examiner.*